United States Patent
Smothers

(10) Patent No.: US 7,565,881 B2
(45) Date of Patent: Jul. 28, 2009

(54) BIRD FEEDER AND KIT

(76) Inventor: Keith Smothers, 9049 Leguna Place Way, Elk Grove, CA (US) 95758

(*) Notice: Subject to any disclaimer, the term of this patent is extended or adjusted under 35 U.S.C. 154(b) by 280 days.

(21) Appl. No.: 11/480,514

(22) Filed: Jul. 5, 2006

(65) Prior Publication Data

US 2007/0006813 A1   Jan. 11, 2007

Related U.S. Application Data

(63) Continuation-in-part of application No. 10/801,039, filed on Mar. 16, 2004, now Pat. No. 7,093,562.

(60) Provisional application No. 60/470,892, filed on May 16, 2003.

(51) Int. Cl.
*A01K 39/02* (2006.01)

(52) U.S. Cl. ............... 119/72; 222/153.05; 222/153.09

(58) Field of Classification Search ................ 119/51.5, 119/61.55, 71, 72, 72.5; 229/103.1; 220/707, 220/709; 222/153.05, 153.06, 153.09, 153.1
See application file for complete search history.

(56) References Cited

U.S. PATENT DOCUMENTS

| | | |
|---|---|---|
| 2,708,421 A | 5/1955 | Jauch |
| 2,775,226 A | 12/1956 | Early |
| 2,891,711 A | 6/1959 | Early |
| 3,354,868 A | 11/1967 | Woodling |
| 3,441,002 A | 4/1969 | Lawalin et al. |
| 3,794,202 A | 2/1974 | Unger |
| 3,945,344 A | 3/1976 | Melrath |
| 3,958,535 A | 5/1976 | Salvia |
| 3,977,557 A | 8/1976 | Hazard |
| 3,990,403 A | 11/1976 | Jacobs |
| 4,104,987 A | 8/1978 | Winston |
| 4,223,637 A | 9/1980 | Keefe |
| 4,223,941 A | 9/1980 | Janzen et al. |
| 4,408,565 A | 10/1983 | Kerbs et al. |
| 4,574,738 A | 3/1986 | Tominaga |
| 4,606,298 A | 8/1986 | Bridge |
| 4,664,066 A | 5/1987 | Steuernagel et al. |
| 4,728,006 A | 3/1988 | Drobish et al. |
| 4,747,370 A | 5/1988 | Olson |
| 4,896,628 A | 1/1990 | Kadunce |
| 4,957,797 A | 9/1990 | Maeda et al. |
| 4,958,595 A | 9/1990 | Richman et al. |
| 4,989,548 A | 2/1991 | Short et al. |
| 5,140,945 A | 8/1992 | Barnhart et al. |

(Continued)

*Primary Examiner*—Bret Hayes
(74) *Attorney, Agent, or Firm*—Nixon Peabody LLP; Marc W. Butler

(57) ABSTRACT

A hummingbird feeder and kit including a solution reservoir, a feeding assembly, and a coupler for unreleasably coupling the feeding assembly to the solution reservoir. In one embodiment, the coupler is a frusto-conical member with a channel running along its longitudinal axis connected to a feeding tube. In yet another embodiment, the couple is a set of fins disposed on a distal end of a feeding tube that engages with an orifice on the solution reservoir. In yet another embodiment, the frusto-conical coupler includes at least one tapered flange disposed on its ramped side wall. The reservoir includes either a dissolvable solid or a premixed feed solution. The unreleasable coupling between the reservoir and the feeding assembly prevents the subsequent re-use of the hummingbird feeders, minimizing the user's contact with bacteria-infested feeding solution and the spread of disease among birds.

14 Claims, 9 Drawing Sheets

U.S. PATENT DOCUMENTS

| | | |
|---|---|---|
| 5,479,879 A | 1/1996 | Biek |
| 5,479,881 A | 1/1996 | Lush et al. |
| 5,495,825 A | 3/1996 | Eckelman |
| 5,634,429 A | 6/1997 | Loomis et al. |
| 5,740,758 A | 4/1998 | Damm |
| 5,740,759 A | 4/1998 | Cummings |
| 6,293,226 B1 | 9/2001 | Hwang |
| 6,374,773 B1 | 4/2002 | McIntyre et al. |
| 6,378,573 B2 | 4/2002 | Schwartz |
| 6,543,632 B1 * | 4/2003 | McIntyre et al. ........... 215/11.5 |
| 6,575,118 B1 * | 6/2003 | McKee ........................ 119/71 |
| 6,685,042 B2 * | 2/2004 | McIntyre et al. ........... 215/11.5 |
| 6,718,912 B2 | 4/2004 | Pappas ....................... 119/72.5 |
| 6,758,165 B2 * | 7/2004 | Pappas et al. ............... 119/72.5 |
| 6,772,914 B2 * | 8/2004 | Hubmann et al. ...... 222/153.09 |
| 7,360,501 B2 * | 4/2008 | Jacobsen ..................... 119/72 |
| 2002/0108579 A1 | 8/2002 | Borries |
| 2003/0121476 A1 * | 7/2003 | McIntyre et al. .............. 119/71 |
| 2003/0168423 A1 * | 9/2003 | Williams .................... 215/204 |
| 2005/0224004 A1 * | 10/2005 | Jacobsen ..................... 119/72 |
| 2007/0289540 A1 * | 12/2007 | Stone et al. .................... 119/72 |

\* cited by examiner

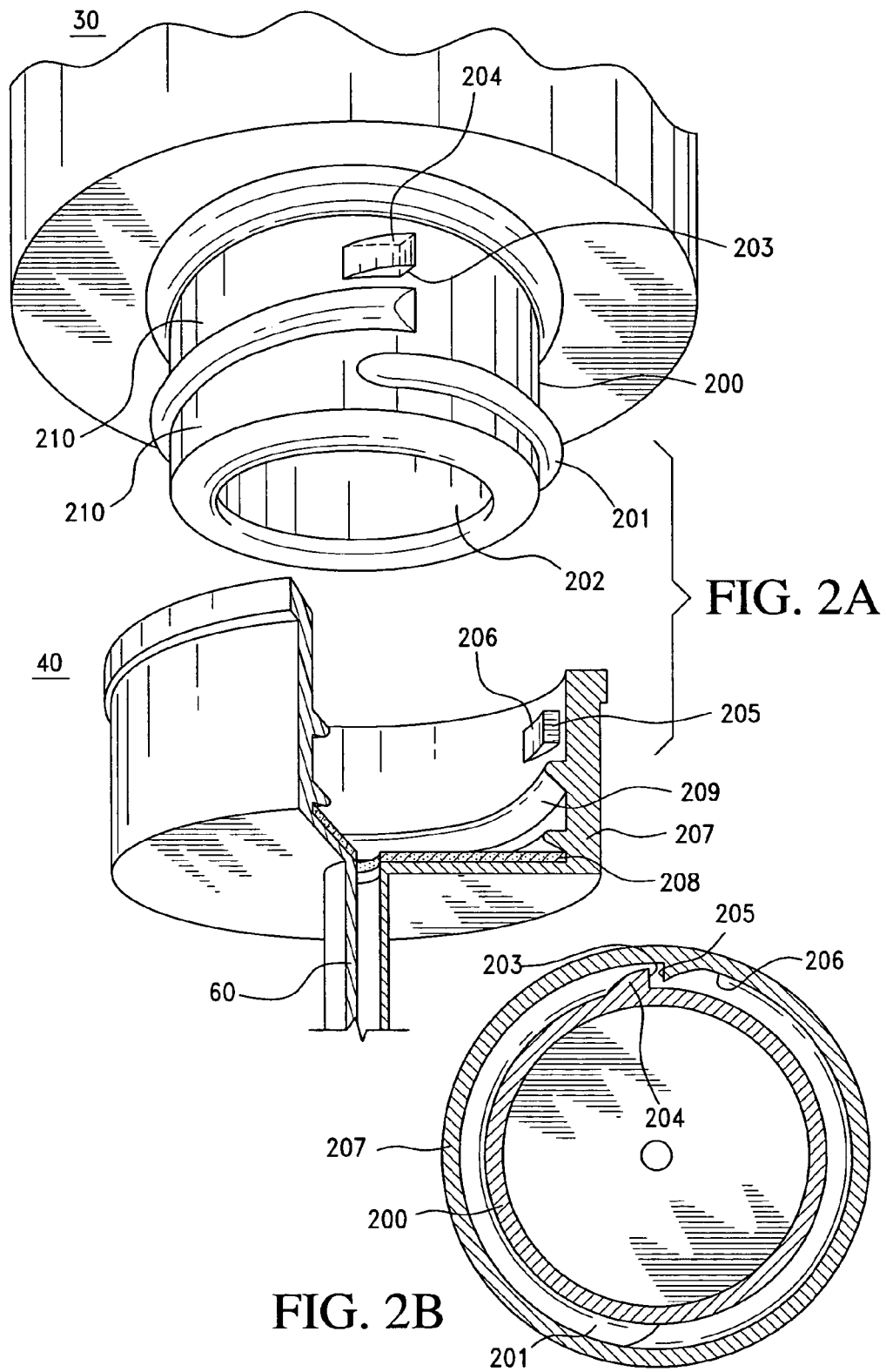

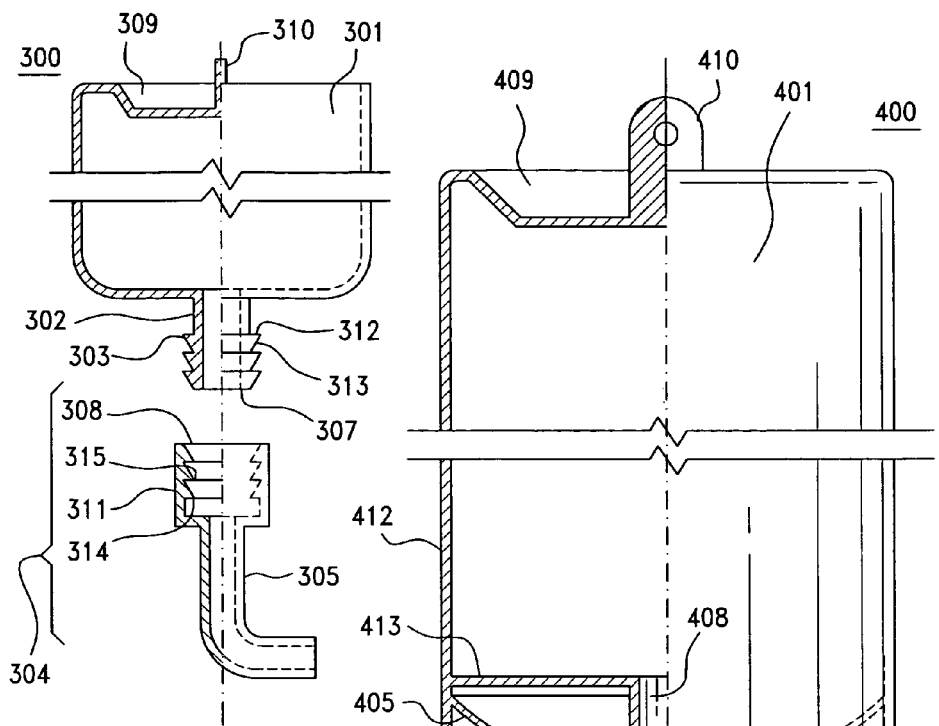
FIG. 3
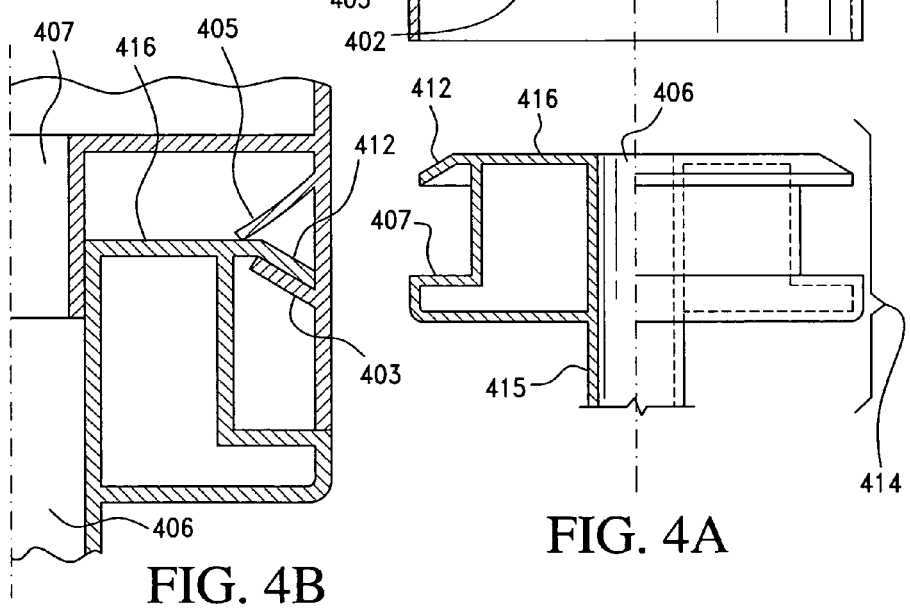
FIG. 4B
FIG. 4A

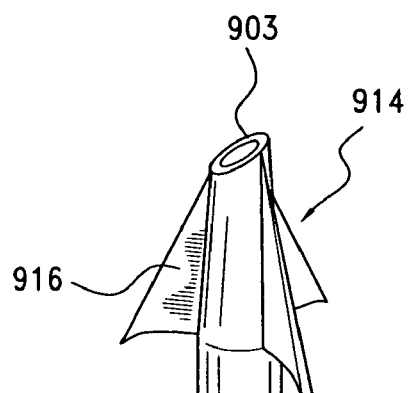
FIG. 9A
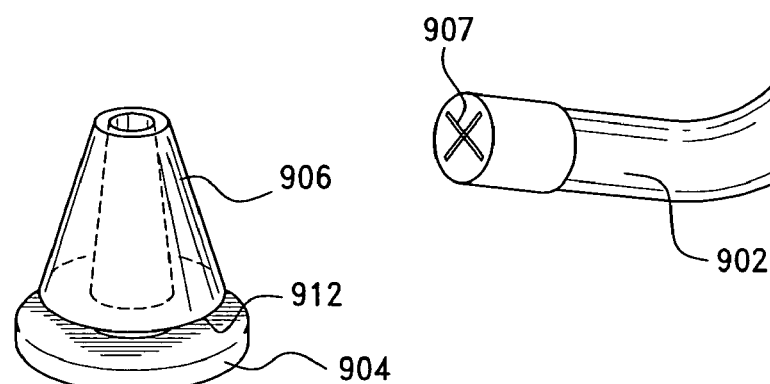
FIG. 9B
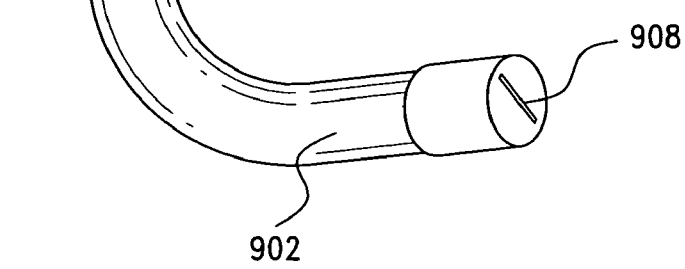

BIRD FEEDER AND KIT

RELATED APPLICATION DATA

This application is a Continuation-in-Part application claiming priority of U.S. application Ser. No. 10/801,039 filed Mar. 16, 2004, which in turns claims priority on provisional application 60/470,892 filed May 16, 2003.

BACKGROUND OF THE INVENTION

1. Field of the Invention

The invention relates generally to the field of bird feeders, more particularly to disposable, recyclable, sanitary hummingbird feeders that prevent the contamination of hummingbird feeding solution, prevent the spread of disease, and do not require cleaning through mechanisms designed to prevent re-use.

2. Description of Related Art

Hummingbird feeding is an increasingly popular hobby among adults and children alike. Indeed, it has become a popular pastime to feed and watch hummingbirds at a feeder at one's residence, and commercial establishments. The feeding of hummingbirds is not only interesting and enjoyable, but further serves the purpose of providing necessary food for the birds during time of diminished natural food supply. In fact, hummingbird feeding has allowed a variety of hummingbird species to extend their historic range into areas where they could not survive without human assistance and to winter north or in a more severe climate. Of all birds, hummingbirds are of particular interest owing to their bright, vibrant colors, their tiny size and their unusual flight patterns. Hummingbirds, however, are not drawn to the conventional bird feeder serving solid food. In the wild, hummingbirds feed on the nectar of a variety of plants and small insects. To feed hummingbirds, therefore, man is limited to providing nectar or a nectar substitute.

Accordingly, conventional hummingbird feeders are designed to store and dispense liquids, typically mixtures of sugar and water. Unfortunately, however, there are many problems and attendant frustration attributable to conventional hummingbird feeders, as those who have tried their hand at feeding hummingbirds are well aware.

In warm climates, in particular, mixtures of sugar and water exhibit a tendency to ferment and provide a media for the growth of bacteria, mold, and mildew. The results of the chemical reaction and contamination of the feeding solution endangers the health of the birds being fed. One such disease known as candidiasis causes swelling of the bird's tongue. A major frustration commonly encountered by owners of conventional feeders, therefore, is the requirement that, in order to maintain a healthy and attractive feeder, the feeder must be cleaned on a regular basis—in most instances, three times per week or more depending on location and temperature.

The cleaning process is a multi-step process that inevitably entails steps of a) removing the feeder from its outdoor location, b) disassembling the feeder, c) cleaning and disinfecting its components—many of which have spaces in tight tolerances that are hard to clean, d) safely disposing of the bio-contaminated solution, e) mixing new solution, f) refilling the feeder with fresh solution, g) reassembling the feeder, and h) replacing the feeder at its outdoor location. The process of cleaning hummingbird feeders, therefore, is a time consuming, messy, and unsanitary process that detracts from the enjoyment of feeding hummingbirds and quickly deters many from continuing to use their feeders.

Because of the difficulties and inconveniences associated with cleaning hummingbird feeders, users often simply refill the hummingbird feeders with fresh solution, while foregoing the cleaning process. This leads to accumulation of harmful bacteria, mold, and mildew in the feeder which, if digested by the hummingbird, is often fatal.

Similar risks are present even to those who clean their hummingbird feeders, as the bacteria and mold that accumulates in hummingbird feeders can also present health risks to humans. Unless the prerequisite precautions are taken in cleaning the feeders, there is a significant risk of infection. For this reason, conventional hummingbird feeders are particularly unsuitable for children who are likely incapable of safely cleaning the feeders absent adult supervision. Yet, children are some of the world's most avid hummingbird enthusiasts.

There is a need, therefore, for a non-reusable hummingbird feeder made of inexpensive disposable or recyclable materials that can be safely discarded or recycled once the feeding solution is fermented, contaminated, depleted, or otherwise rendered ill-suited and unsafe for consumption by hummingbirds or exposure to humans.

BRIEF SUMMARY OF INVENTION

In view of the above, it is a general purpose of this invention and its various embodiments, which will be described in greater detail, to provide a one-time use hummingbird feeder.

An aspect of the present invention is to provide a hummingbird feeder that does not require cleaning.

Another aspect of the present invention is to provide a hummingbird feeder that is not suitable for re-use.

Another aspect of the present invention is to provide an inexpensive and economical hummingbird feeder that can be cheaply, safely, and easily disposed in an environmentally-safe manner.

A further aspect of the present invention is to provide a sanitary hummingbird feeder that reduces the instances of disease among hummingbirds.

Yet another aspect of the present invention is to provide a hummingbird feeder having a tamper-resistant solution reservoir.

A further aspect of the present invention is to provide a hummingbird feeder with a means for preventing the contamination of the feeding solution.

Another aspect of the present invention is to provide a hummingbird feeder kit comprising a reservoir with pre-made solution or nourishment and a feeding assembly adapted to render the feeder ready for use when unreleasably engaged to the reservoir.

These and other objects and advantages are achieved by providing a hummingbird feeder comprising a solution reservoir, a feeding assembly, and a coupler for unreleasably coupling said feeding assembly to said solution reservoir, thereby preventing the subsequent re-use of the hummingbird feeders and minimizing the user's contact with bacteria-infested feeding solution.

Further, the means for unreleasably coupling the feeding assembly to the solution reservoir is destroyed if the feeding assembly is subsequently disengaged from the solution reservoir, thereby preventing the subsequent re-use of the hummingbird feeders and minimizing the user's contact with bacteria-infested feeding solution.

In a yet another embodiment, the feeding assembly has single feed and multiple feed capability.

The invention will be better understood and aspects of the inventions other than those set forth above will become apparent when consideration is given to the following detailed description thereof.

BRIEF DESCRIPTION OF DRAWINGS

FIG. 2A is an exploded view of a neck of a reservoir and a one-way screw cap embodiment of the present invention.

FIG. 2B is a cross-section view along line 2B in FIG. 1B illustrating a one-way feeding assembly screw cap of the present invention.

FIG. 3 illustrates another embodiment of the present invention.

FIG. 4A illustrates yet another embodiment of the present invention.

FIG. 4B illustrates a magnified view of a feeding assembly in a locking position with a reservoir of FIG. 4A.

FIG. 9A illustrates a feeding assembly with a leakage reducing means.

FIG. 9B illustrates a feeding assembly with a stopper and another leakage reducing means.

DETAILED DESCRIPTION OF INVENTION

Figures 1A, 1B:
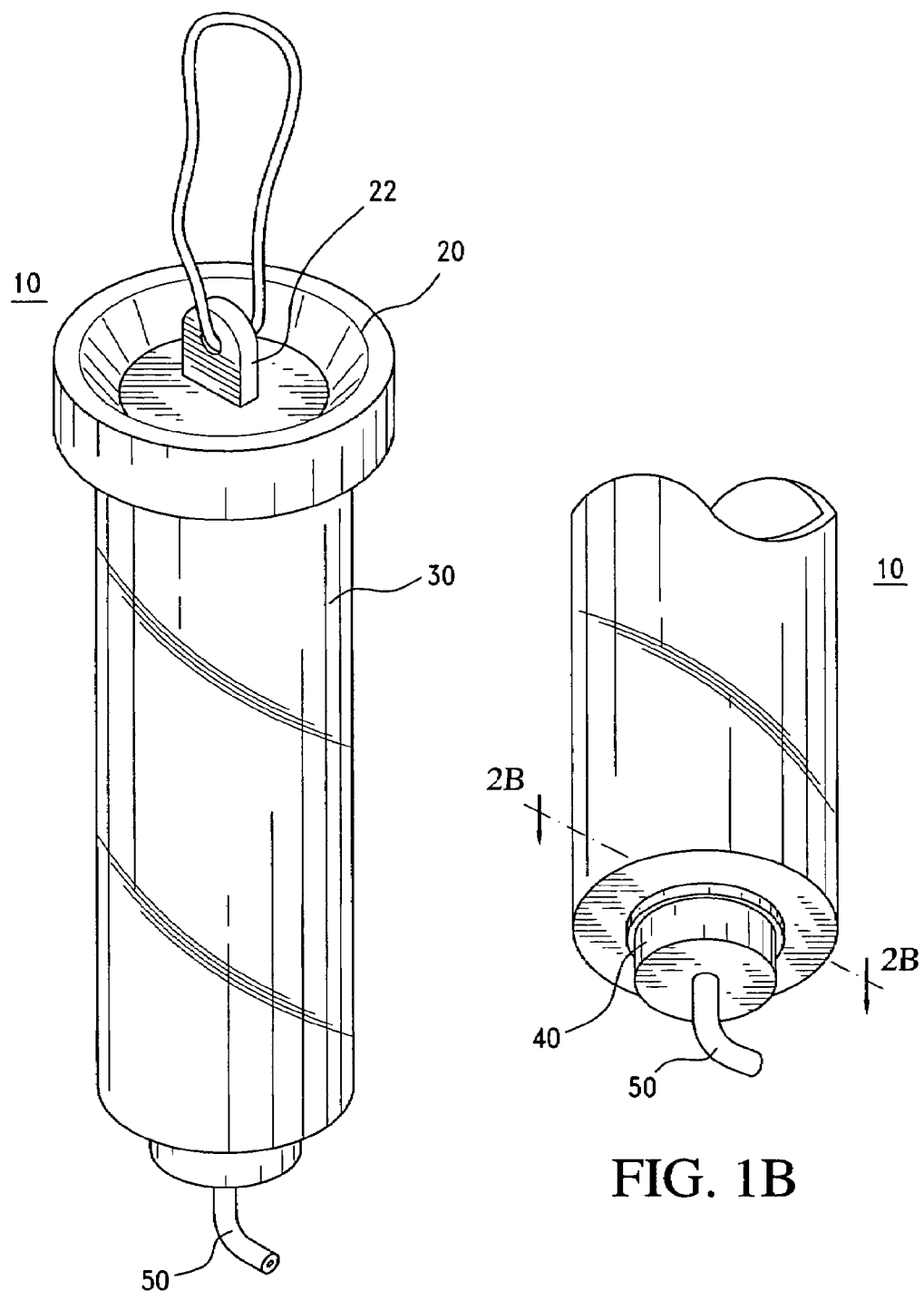
FIG. 1A is a top perspective view of an embodiment of a feeder of the present invention.
FIG. 1B is a bottom perspective view of the feeder in FIG. 1A.

Throughout this specification and the drawing figures associated with this specification, numerical labels of previously shown or discussed features may be reused in another drawing figure to indicate similar features.

As illustrated in FIG. 1, a feeder 10 comprises a hanger tab 22, a solution reservoir 30 preferably with built in crawling insect barrier 20, and the feeding tube assembly 40 with a feeding tube 50. The feeding tube assembly 40 is easily unreleasably coupled to the feeding reservoir 30. The assembly is manufactured to incorporate ease of use and a one-time use feature that is explained in detail hereafter in reference to various exemplary embodiments.

As shown in FIG. 1, hanging tab 22 is provided to allow feeder 10 to be hung and used at a desired location. The crawling insect fluid barrier reservoir 20, which may merely be open on its topside, or an optional attachment to reservoir 30, so when filled with a liquid such as water or cooking oil, will prevent crawling insects from reaching the feeding tube 50 and accessing feeding solution.

Feeding solution reservoir 30, as exemplified in FIG. 1, is an elongated cylindrically shaped container for housing hummingbird feed solution. Other geometric shapes and sizes, as well as shapes in form of animals and flowers, of different colors for the solution reservoir are possible. The volume in the solution reservoir, or course, can vary depending on size of the solution reservoir and the amount of feeding solution to be distributed. In addition, this feeder could be incorporated for feeding other types of birds and animals.

As shown in FIG. 2A, the bottom side of solution reservoir 30 has neck 200. On the outside wall of neck 200 is a raised helical thread 201 defining a helical path 210. The neck 200 further has a locking member comprising a ramped surface 204 and a blocking surface 203, which are positioned in the helical path 210. The neck 200 also has an opening 202 for a feed solution to flow out into feeding tube assembly 40.

As further shown in FIG. 2A, feeding assembly 40, which couples with neck 200 when the feeder is in a final state of assembly for use, comprises a cap portion having a wall 207. Within the wall 207 of the cap, there is provided a raised helical thread member 206 engaging with the helical path 210 on the neck 200 in a coupled position. In addition to the helical thread member 206 on the inside of wall 207 of the feeding tube assembly, there is a complementary locking member having a ramped surface 206 and a blocking surface 205, which cooperate with the ramped surface 204 and blocking surface 203 on the neck 200 to allow a one-way coupling of the feeding tube assembly 40 and the neck 200 of the feed reservoir 30. There is also provided inside the feeding tube assembly 40 an optional gasket 208 which compresses against an opening rim 202 of the neck 200 to provide a tight seal between the feeding tube assembly 40 and the neck when the feeding tube assembly is completely screwed onto and interlocked with the neck 200.

While assembling the reservoir 30 and the feeding tube assembly 40 together to form a complete feeder 10, the threaded feeding tube assembly is screwed onto the neck 200 of the reservoir 30 in a clockwise closing direction. During the clockwise closing motion, and as the blocking surface 203 on the neck 200 reaches the blocking member of the feeding tube assembly 40, additional torque is applied to cause the ramped surfaces 204 and 206 to slide over each other reaching a blocking and locking position where the blocking surfaces 205 and 203 directly face each other in an abutting position thus preventing any counter-clockwise or reverse movement of the feeding tube assembly relative to the neck 200. An illustration of the locking and blocking members in an engaged and locked position is shown in FIG. 2B.

As the ramped surfaces 204 and 206 slide over each reaching a locking and blocking position described above, a positive audible feedback, such as a clicking noise, may be created, which indicates that the unreleasable one-way coupling between the reservoir 30 and the feeding tube assembly 40 is completed.

The blocking member 203 and the ramped surface 204 of the neck 200, as well as the blocking member 205 and the ramped surface 206 of the feeding tube assembly 40 are preferably positioned such that a positive blocking and locking affect is accomplished immediately when the feeding tube assembly 40 is screwed onto the neck 200.

The above-described unreleasably one-way coupling is possible with the selection of the material constituting the neck 200 and feeding tube assembly 40 such that some deformation of one or both parts takes place during the engagement of the ramped surfaces. It is noted that proper tolerance, as well as proper material selection, between the coupling parts is essential to ensure that the ramped surfaces are able to slide over one another into place the locking and blocking members in a cooperative relationship, and to ensure that the blocking surfaces 205 and 203 maintain an abutting position against each other thus preventing the unscrewing or disassembling of the reservoir 30 and the feeding tube assembly 40. In such an interlocking position, the feeding tube assembly 40 is unreleasably coupled to the reservoir 30 in such a manner that renders the feeder 10 as a one-time use only feeder in which refilling the reservoir with a feeding solution would not be readily possible and thus reusing the feeder would be discouraged.

One of ordinary skill in the art will appreciate that the above-described embodiment is only an example of the one-way unreleasable coupling between the reservoir and the feeding tube assembly of the present invention. Variations of the embodiment are possible without departing from the spirit of the above-described one-way unreleasable coupling of the feeding tube assembly and the reservoir. For example, the locking and blocking member on the neck may be positioned at another location in the helical path on the neck; two helical paths may be disposed on the neck or on the feeding tube assembly; and, more than one of locking and blocking member may be disposed on the neck and on the feeding tube assembly.

As another embodiment of the locking and blocking members on the neck and on the feeding tube assembly, one of the locking and blocking member can be a ramped indentation of a sufficient depth to provide an abutment surface, while the other locking and blocking member is a raised or protruding member that fits into the indentation and resting against the abutment surface. The protruding member has a higher profile than the helical rib co-locating on the same side with the protruding member. This embodiment is also effective in allowing the neck and the feeding tube assembly to be rotated in a clockwise closing direction while in the process of being assembled but restricting them from being rotated in a counter-clockwise opening rotational direction in relation to each other once the members are in a locked position.

Another embodiment of the feeder of the present invention is shown in FIG. 3. The feeder 300 includes a feed reservoir 301 having a neck 302, a barrier 309 against crawling insect, and a hanging tab 310. The neck 302 includes an unreleasable coupler 303 which surround the outside of neck 302 with triangular-shaped flanges. Each triangular-shaped flange of the neck 302 comprises an abutment surface 312 and a ramped sliding surface 313. As shown in FIG. 3, there are three triangular-shaped flanges disposed around the neck 302. There can be any number of the triangular-shaped flange, however, at least two such triangular-shaped flanges are preferred.

The feeder 300 further includes a feeding tube assembly 304 connected to a feeding tube 305. The feeding tube assembly 304 comprises a cylindrical wall 311 with an interior surrounded by triangular-shaped indentations or flanges that unreleasably receive the triangular-shaped flanges on the unreleasable coupler 303 of the neck 302. Each triangular-shaped receiving flange or indentation on the feeding tube assembly 40 is comprised of an abutment surface 314 and a ramped sliding surface 315.

As an alternative to having triangular-shaped receiving flanges disposed annularly on the inside cylindrical wall 311, there may be a plurality of triangular-shaped notches or claws disposed at an equal distance from each other on the inside of the cylindrical wall 311. These notches or claws would interlock with the triangular-shaped flanges on the neck 302 when the feeding tube assembly is fitted over the neck 302.

In the feeding tube assembly 304, a gasket, not shown, that is similar to gasket 208 in FIG. 2A may be employed to provide an additional sealing to prevent liquid leakage between the feeding tube assembly 304 and rim 307 of the neck 302.

In use, once the reservoir 301 is determined to be filled with a feeding solution, the feeding assembly 304 is pushed onto the neck 302 to complete the assembling of the feeder 300. Some force will be necessary to overcome frictional forces between the unreleasable coupler of the neck 302 and the feeding tube assembly 304. By pushing the feeding tube assembly onto the neck 302, the ramped sliding surfaces 313 and 315 glide over one another in one direction. Once at least one triangular-shaped flanges on the neck 302 interlock with one of the triangular-shaped flanges or indentations on the feeding tube assembly 304, the abutment surfaces 312 and 314 abutting against each other thus preventing the feeding tube assembly from separating from the neck 302. In such a cooperative position, the feeding tube assembly 304 is unreleasably coupled to the reservoir in such a manner that renders the feeder 300 as a one-time use only feeder in which refilling the reservoir with a feeding solution would not be readily possible and thus reusing the feeder would be discouraged It is noted that by the above-discussed embodiment, as well as in other embodiments of the present invention discussed herein, the feeding tube assembly 304 is unreleasably coupled the reservoir 301. As used herein, the term unreleasably means that it would take undue forces to disassemble the feeding tube assembly from the reservoir. Such undue forces, if used in the disassembly, would damage the feeder beyond its designed mode of use.

Another embodiment of the present invention is illustrated in FIGS. 4A and 4B. A feeder 400 shown in FIG. 4A comprises a reservoir 401 and a feeding tube assembly 414. The reservoir 401 comprises a cylindrical wall 412, a closed top end 409 having a trough and surrounding an integral hanging tab 410, a bottom end 413 having a neck 402 with an opening 408 through which a feeding solution flows, and a skirt 404, which is an extension of the cylindrical wall, at the bottom end of the reservoir wall 412. Disposed around the inner circumference of the skirt 404 is an upwardly-angled lower annular flange 403, and optionally a downwardly-angle top annular flange 405, which is positioned between the lower annular flange 403 and the bottom end 413 of the reservoir.

The feeding tube assembly 414 comprises a bottom face having a shoulder 407, a top face 416 having a downwardly angled outer lip 412 around the perimeter of the top face 416, a conduit 415 with a receiving opening 406 which tightly fits over the neck 402 of the reservoir when the feeding tube assembly is coupled to the reservoir 401.

In assembling the feeder 400, the feeding tube assembly 414 is pushed onto the bottom 413 of the reservoir 401 with the opening 406 of the feeding tube assembly 414 mating with neck 402 and its opening 408 on the reservoir 401. With a slight force the downwardly-angled outer lip 412 of the feeding tube assembly 401 glides over the upwardly-angled lower flange 403 of the skirt 404 and into a secured position between the lower flange 403 and the bottom end 413 of the reservoir 401. The cooperatively angled lower flange 403 and outer lip 412 facilitate the insertion of the feeding tube assembly 414 into the skirt 404, as well as provide an interlocking mechanism preventing the feeding tube assembly from being released from the reservoir 401.

FIG. 4B illustrates the position of the outer lip 412 in relation to the lower flange 403 in an interlocking position. In such a cooperatively interlocking position, the feeding tube assembly 414 is unreleasably coupled to the reservoir 401 in such a manner that renders the feeder 400 as a one-time use only feeder in which refilling the reservoir 401 with a feeding solution would not be readily possible and thus reusing the feeder 400 would be discouraged. If the assembled feeding tube assembly 414 is separated from the reservoir 401, the outer lip 412 and/or the lower flange 403 would be destroyed thus rendering the feeder 400 non-reusable.

The optional downwardly-angled top flange 405 can serve as a stopper or a bias to prevent the feeding tube assembly 414 from sliding further toward the bottom end 413 of the reservoir. An alternative means for biasing the outer lip 412 to rest on the lower flange 403 to keep the feeding tube assembly from moving may include a spring disposed around the neck 402. A yet another alternative is not to have any stopper or biasing means at all. Instead, the frictional force between the neck 402 and the opening 406 may be advantageously used to keep the feeding tube assembly 414 in a fixed position.

The neck 402 shown in FIG. 4A as substantially cylindrical. However, the neck 402 may be tapered toward opening 408 such that a tighter seal can be achieved as the opening 406 of the feeding tube assembly 414 is pushed further onto the neck 402. A tapered neck 402 would also serve as a stopper to prevent the feeding tube assembly from being pushed completely into the skirt 404.

Figures 5A, 5B:
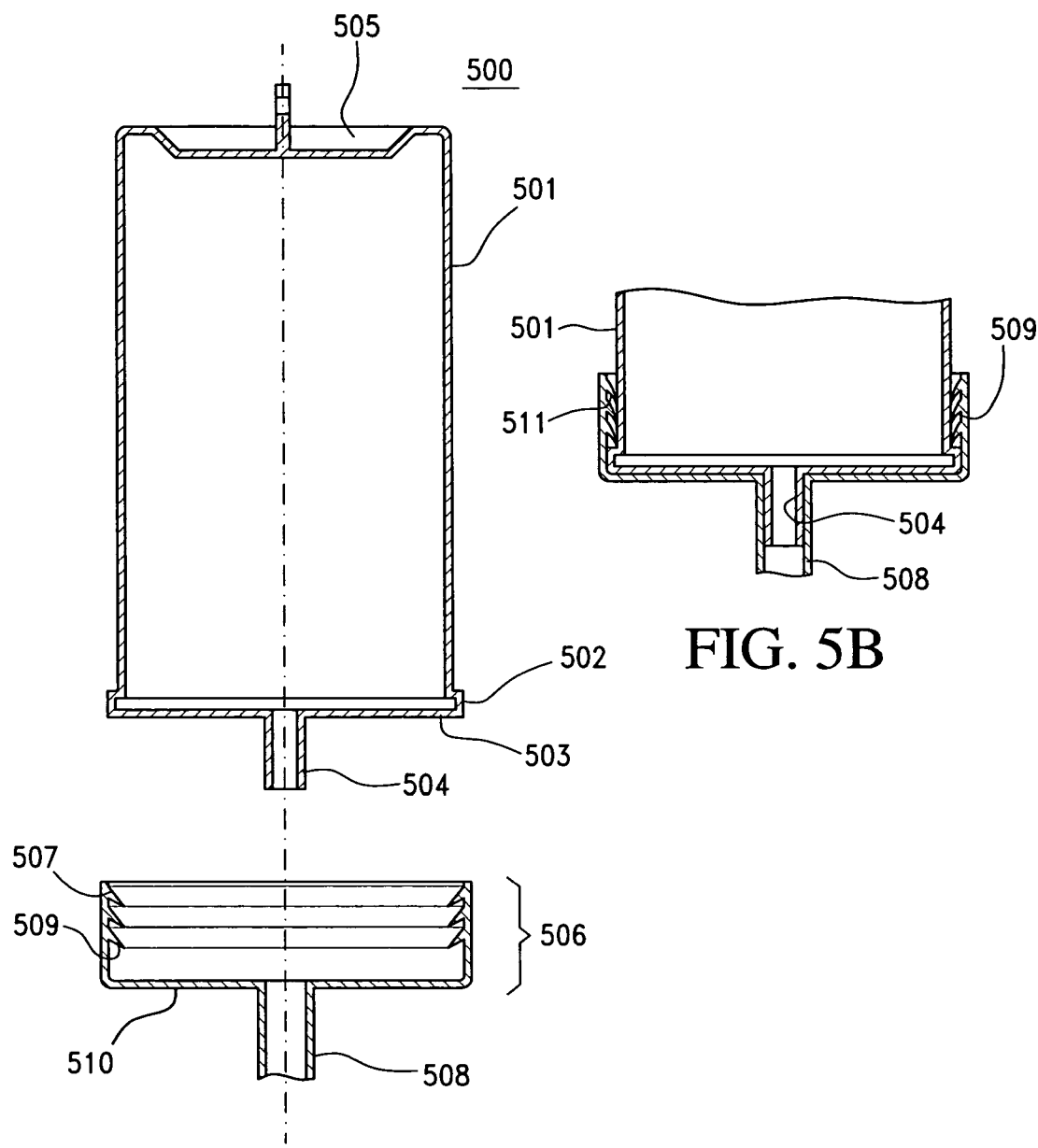
FIG. 5A is yet another embodiment of the present invention.
FIG. 5B illustrates the feeding assembly of FIG. 5A in a coupled position of the reservoir.

Another embodiment of the feeder of the present invention is shown in FIGS. 5A and 5B. A feeder 500 comprises a reservoir 501 and a feeding tube assembly 506. The reservoir 501 includes a closed top end 505 and an open bottom end. As shown in FIG. 5A, instead of being open, the bottom end can optionally be covered with an end face 503 having a spout 504, as an extra precaution against leakage. The bottom end of the reservoir comprises a brim 502. The feeding tube assembly 506 is cylindrical member with a side wall 509 defining a open end and a closed end 510 equipped with and spout or neck 508. The open end of the feeding tube assembly 506 communicates with the open end of the reservoir 501, if the reservoir does not have an end face 503 and a spout 504.

The interior of the side wall 509 comprises at least one tapered flange 507. The flange is preferably thinner at one edge and is thicker at the other edge, i.e., the base edge attached to the interior wall 509 so as to make it flexible at the thinner edge. The flange 507 is also angled such that during the insertion of the feeding tube assembly 506 over the reservoir, the brim 502 can easily glide over the angled flange in one direction, thus allowing the feeding tube assembly 506 to interlock with the brim 502 of the reservoir. Because of the angled flange and of the thick and structurally strong base edge, the feeding tube assembly 506 cannot be separated from the reservoir 501 without using undue forces. Moreover, as the flange 507 is flexible, it is bendable, as shown by flange 511 in FIG. 5B, to create a liquid-tight coupling between the feeding tube assembly 506 and the reservoir 501.

As previously mentioned, using undue forces to disassemble the feeder of the present invention would damage the feeder. In this particular embodiment, either the flange 507 or the brim 502 would be damaged. Therefore, the feeding tube assembly 506 is unreleasably coupled to the reservoir 501 in such a manner that renders the feeder 500 as a one-time use only feeder in which refilling the reservoir with a feeding solution would not be readily possible and thus reusing the feeder would be discouraged.

Figure 6:
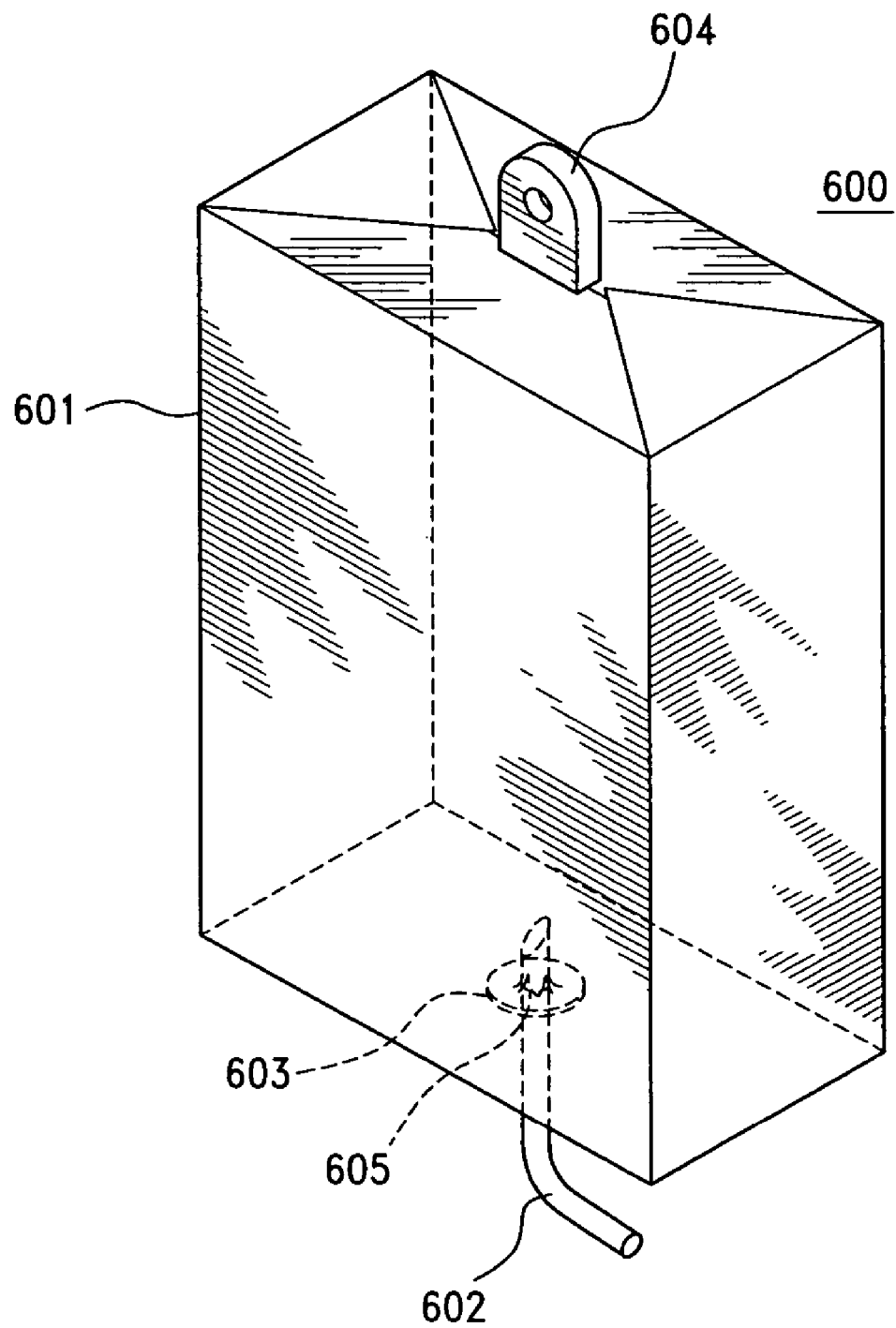
FIG. 6 is a perspective view of yet another embodiment of the present invention.

In yet another embodiment of the present invention shown in FIG. 6, a feeder 600 comprises a reservoir 601 and a feeding tube 602. The reservoir 601 has an opening 605 at a bottom end and a hanging tab 604 at the other end. The opening 605 is preferably covered with a frangible membrane (not shown) and is re-enforced with a flexible ring 603. A purpose of the flexible ring 603 is to retain the feeding tube 602 in place once it is inserted into the reservoir by pinching the wall of the feeding tube and providing a frictional grip thereon.

The reservoir 601 shown in FIG. 6 is can be a rectangular box made of cardboard treated with a liquid impermeable layer. However, any type of container may be employed and any shape, size, color, or composition may be used.

Figure 7:
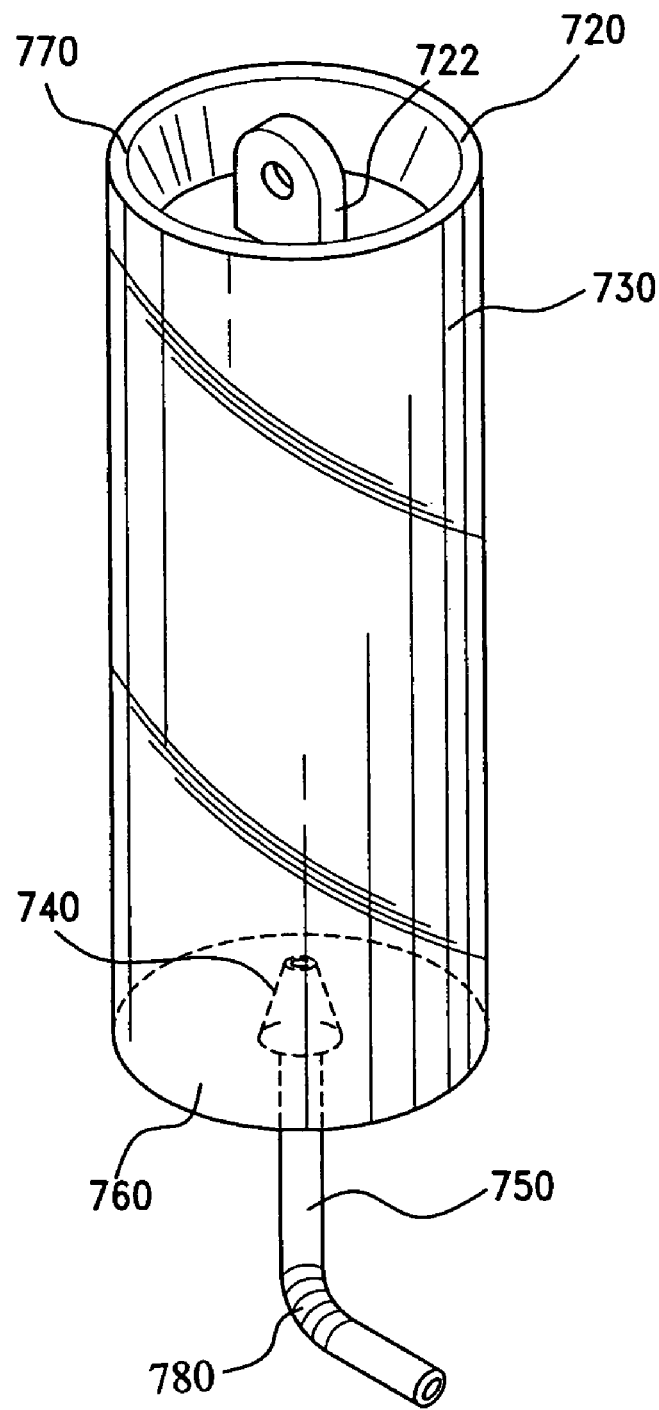
FIG. 7 is yet another embodiment of the present invention that is an extension of the embodiments in FIG. 6 and FIG. 1.

In yet another embodiment of the present invention shown in FIG. 7. Similarly to the above-discussed embodiment shown in FIG. 1, FIG. 7 shows a hanging tab 722 is provided to allow feeder 700 to be hung and used at a desired location. The crawling insect fluid barrier 720, which may be open on its topside or an optional attachment to feed reservoir 730. The feeder includes a feed reservoir 730, a bottom end 760 and top end 770. The hanging tab 722 is preferably recessed or flushed with the fluid barrier 720 or with the feed reservoir 730 so as to render the feeder compact and without any protrusion for the convenience of packaging and being able to stand the feeder on one end when necessary during the insertion of a feeding assembly at the opposite end.

Of notable departure from the embodiment shown in FIG. 1 or the embodiment shown in FIG. 6, the embodiment of FIG. 7 includes the bottom end 760 adapted to accept a feeding assembly having a feeding tube 750 and a coupler 740. The details of the various embodiment of the feeding assembly are shown as in FIG. 8, FIGS. 9A, 9B and 9C, which will be discussed in detail below.

Figure 8:
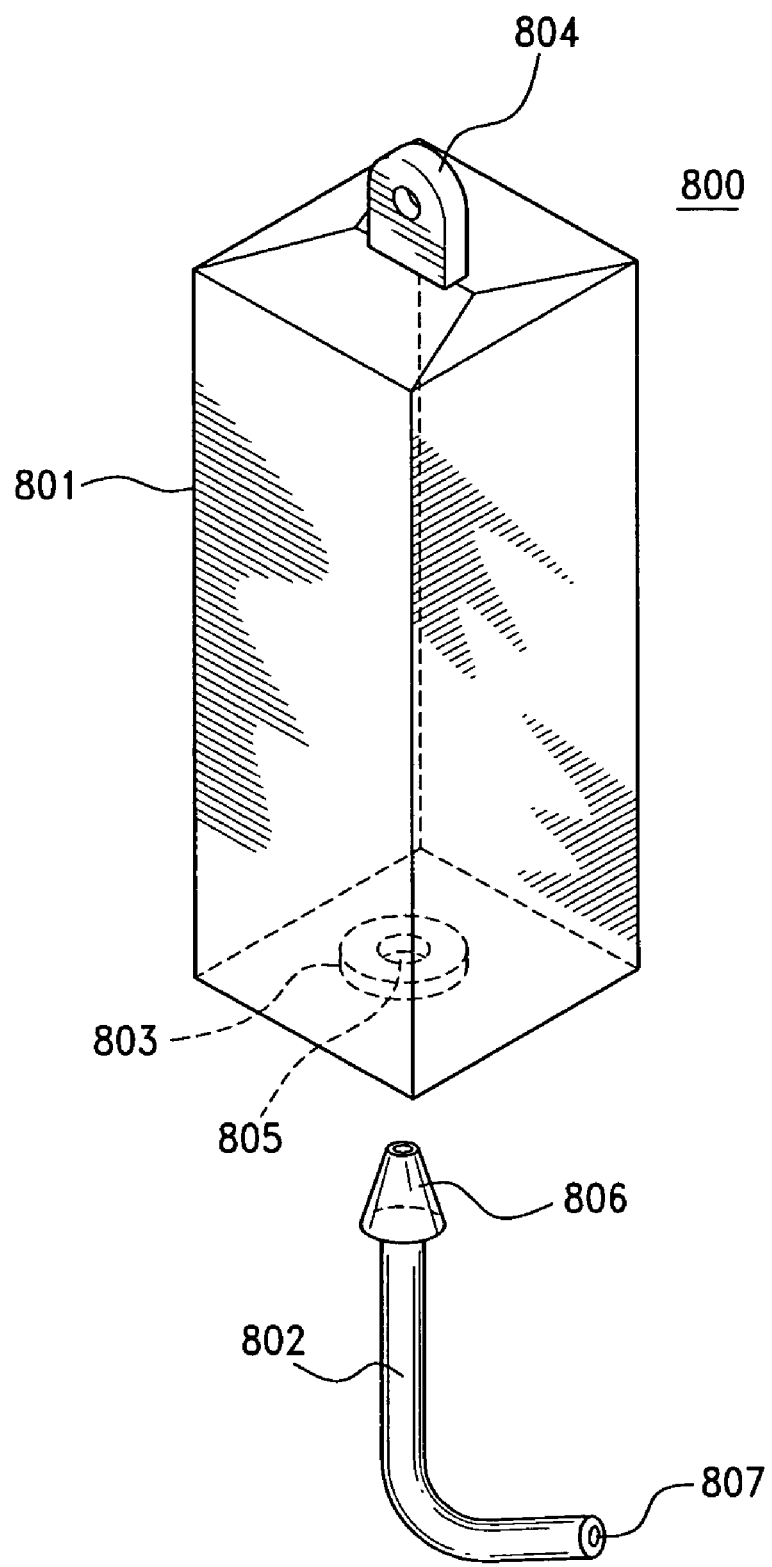
FIG. 8 illustrates a feeding assembly before being inserted and coupled to the reservoir.

FIG. 8 shows a feeder 800 having feeding assembly comprising a coupler 806 attached to feeding tube 802. The feed assembly shown is unattached to a feed reservoir 801. At a bottom end 808 is an opening 805 through which the feeding assembly is inserted and unreleasably retained. At one distal end of feeding tube 802, there is provided a frusto-conical shape coupler 806. Through the center of the frusto-conical coupler 806 is a channel for conveying nourishment from the feed reservoir 801 to an outlet end 807 or a feeder point at the other distal end of the feeding tube 802.

Although the reservoir 730 is shown in FIG. 7 as a cylindrical container and the reservoir 801 is shown as an elongated squarish box, any types of container may be employed and any shape, size, color, proportion, or composition, as well as decorations, may be used so long as aesthetic value of the feeder is taken into consideration to provide a pleasant and enjoyable effect.

Unlike the embodiment of FIG. 6 which retains a feeding tube in an opening by compression force from a flexible ring when the feeding tube is inserted into the reservoir, the coupler 806 in FIG. 8 is used as a means lock the coupler 806 in a coupled position with the feed reservoir as well as to break a frangible membrane (not shown) covering the opening 805 disposed on bottom side 808 of the feed reservoir 801. The coupler 806 is a frusto-conical member having one piercing end of a smaller size than the opening 805.

To prevent the feeding assembly from being detached from the feeding reservoir once the feeding assembly is inserted, a large end of the frusto-conical coupler 806 acts as an anchor and abuts against the wall of the bottom side 808. Naturally, the large end of the coupler 806 has a larger diameter than the opening 805 so as to prevent the coupler from being pulled out of the opening 805 and decoupled from, the feed reservoir. It is noted that the size of the large end of the coupler is dependent on the material used for forming the opening. If the material used has little flexibility or resilience, the passage of an improperly sized frusto-conical coupler 806 through the opening 805 can cause damages to the opening such that a liquid-tight seal cannot be achieved once the feeding assembly is inserted therethrough.

As for the material used as the bottom side 808 on which the opening 805 is formed, laminated cardboard, such as that used in a conventional juice box, or plastic may be used. The remaining portions of the feeder 800 may be of a different material, such as Mylar, PVC, aluminum, etc.

In case reinforcement is needed to provide resilience and strength to the opening 805, an annular member 803, as shown in FIG. 7, made of a strong and resilient material, such as natural rubber, plastic or the like, may be used. The annular member 803 may be fused, welded, glued, bonded or crimped to the bottom side 808.

Figure 9C:
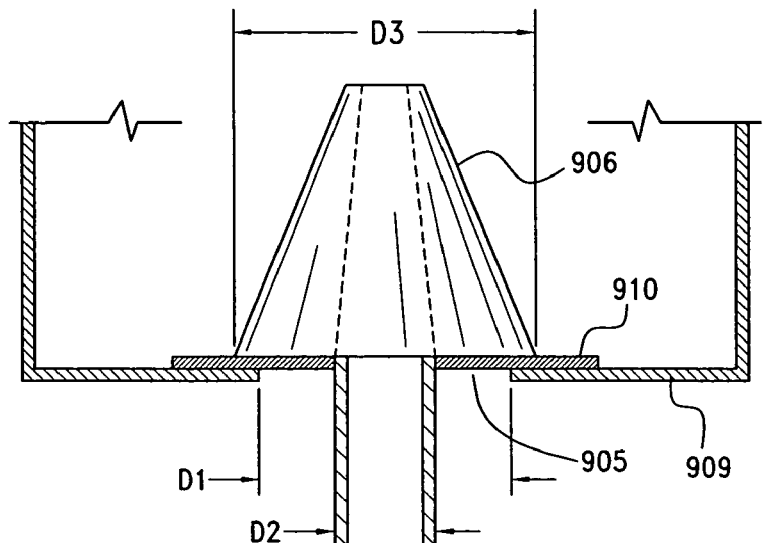
FIG. 9C illustrates an exemplary embodiment of a feeding assembly in a coupled position with a feeder reservoir.

FIG. 9C shows an exemplary embodiment of a coupler 906 in an engaged position with a wall portion 909 of a feed reservoir. A strong and resilient ring 910 is utilized to reinforce opening 905 having diameter $D_1$. The ring 910 has a hole with a diameter of $D_2$, which is approximately the same size as the diameter of the outer wall of the conduit or feeding tube 902. The tightness of a seal between the hole in the ring 910 may be controlled by varying the diameter of the hole to be slightly smaller than $D_2$.

Further, the frusto-conical coupler 906 has a large end having a diameter $D_3$ and a small end having a diameter of equal to or less than $D_2$ for effectively piercing a membrane or a cover of the opening 905. The diameter $D_1$ of the opening 905 is preferably slightly smaller than the diameter $D_3$ such that a positive feedback can be felt as the coupler 906 penetrates through the opening 905. Further, the diameter $D_1$ is preferably no larger than the diameter $D_3$ and at least as large as the diameter $D_2$. The aforementioned sizes and dimensions are dependent on the materials used for the frusto-conical coupler, the ring 910 and portion 909 of the feed reservoir, all of which interact with one another to create an unreleasable feeding assembly that would destroy the opening 905 and the feed reservoir so as to prevent subsequent re-use of the feeder, if one were to attempt to separate the feeding assembly from the feed reservoir.

As an alternative to the embodiment shown in FIG. 9C, the ring 910 may be provided on the outside of the feed reservoir wall 909. Further, instead of having a separate frangible membrane to cover the opening 905 to seal in the nourishment inside the feed reservoir, the ring 910 may be modified to include a scored portion (not shown) forming an outline of a hole. In this case, the modified ring 910 serves both as a strong and resilient re-enforcement for the opening 905 and as a sealing and covering member the opening 905 to keep nourishment inside the feed reservoir fresh. The coupler 906 may be utilized to break the scored portion of the ring, which has been weakened rendered easily breakable, thereby creating a hole through which the feeding assembly can be inserted.

FIG. 9B discloses a stopper 904 disposed in proximity to the coupler 906. The stopper 904 prevents the coupler 906 from being insert too far beyond the opening of the feed reservoir so as to allow as much nourishment as possible to exit the feed reservoir when the feeder is hung during use. Further, the feeding assembly in FIG. 9B includes a leakage mitigation means 908 disposed at the feeder point. The leakage mitigation means 908 may be a flexible member having at least one slit.

The feeding tube 902 may be fixedly bent at an upward angle to counter the gravitation force pushing nourishment out of the feed reservoir, such as shown in FIG. 9B or adjustably bent at any angle suitable by a flexible elbow 780 as shown in FIG. 7. The flexibility of the elbow can be a pliable characteristic of the material of feeding tube or a set of ridges, such as in an accordion, providing an adjustable bend. In general, leakage of nourishment at the feeding point of the feeding tube does not exist when all mating surfaces between cooperating parts fit properly. However, for a number of reasons, perfectly mated feeding assembly and feed reservoir may not be achieved and thus a small leakage at the feeding point may occur. To solve this problem and/or to further reduce the rate of flow of nourishment from the feed reservoir, a flow-control, such as member with a slit, may be used. Another type of slit comprising two crossed slits, such as shown in 907 of FIG. 9A, may also be used. An animal, such as a hummingbird, can easily reach the nourishment by inserting its beak between the slit.

Although a coupler of a frusto-conical shape is discussed above with respect to the embodiment of FIGS. 7, 8, 9B and 9C, other types of coupler may be utilized to provide a one-way insertion of the feeding assembly into the feeder and to provide an unreleasable coupling therebetween. For example, as shown in FIG. 9A, coupler 914 is equipped with fins 916 that are disposed at equal distance from one another around feeding tub 902 and in proximity to tip 903 of the feeding tube 902. As shown, there are three fins. However, any number of fins may be possible. It is preferable that two ore more fins are provided.

Each fin 916 preferably includes a straight side edge connected to a curved edge so as to form a hooked member, as shown in FIG. 9A. An advantage to having fins or hooked fins is that the fins are easily flexed and deformed while passing through a small opening of the feed reservoir without damaging the opening. Once passed through the opening, the fins 916 act as an anchor resisting forces that pull the feeding assembly from the feed reservoir. If undue forces are applied, the fins 916 would tear the feed reservoir and render the feeder un-reusable thereby the one-time use feature of the present invention is achieved. As an alternative to having fins, a plurality of hooks or barbs (not shown) can be disposed on one end of the feeding tube that is inserted into the opening of the feed reservoir.

Figure 10:
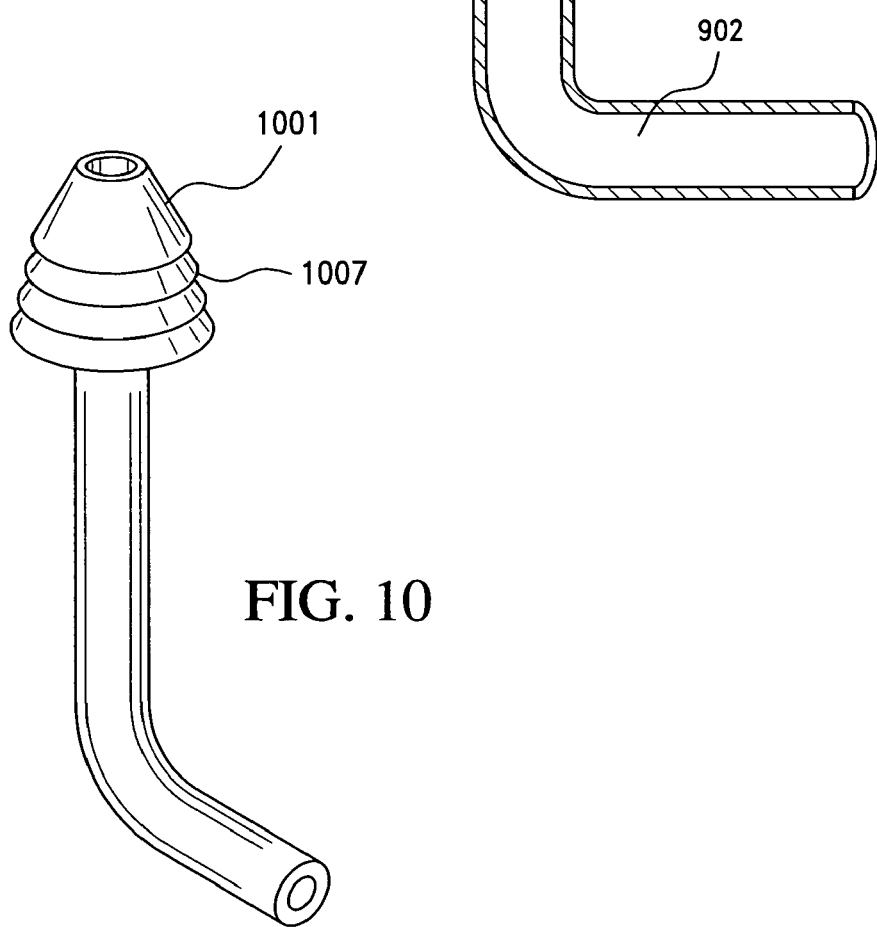
FIG. 10 illustrates another embodiment of a feeding tube assembly.

FIG. 10 is another embodiment of the invention which includes a feeding assembly 1000 having a frusto-conical coupler 1001. Disposed on the sloped side surface of the frusto-conical coupler are tapered flanges 1007, which are similarly shaped as tapered flanges 507 in FIG. 5A and flanges 511 in FIG. 5B. The flanges 1007 are angled such that during the insertion of the feeding tube assembly 1000 into an opening of the feed reservoir, the edge of the opening can easily glide over the angled flange in one direction, thus allowing the feeding tube assembly 1000 to interlock with material forming the opening of the reservoir. By being tapered and angled, the flanges 1007 are bendable in one direction but resist bending in the opposite direction when one attempts to release the feeding tube assembly 1000 from feed reservoir. Once the feeding assembly is tightly coupled with the feed reservoir, movement of the coupler in the opposite direction would break or deform the tapered flanges or damage the opening such that reinsertion of the coupler is possible.

Instead of taper flanges, hooks or barbs (not shown) can also be disposed on the outer wall or sidewall of the frusto-conical coupler so as to anchor the coupler to the feed reservoir. The use of a frusto-conical coupler 1001 with tapered flanges 1007, or the like, is advantageous in that the use of a flexible ring to seal and reinforce the opening is not necessary and the coupler can be used with relatively large opening with good sealing property.

In various embodiments discussed above, the feeding tube assembly have been disclosed as being disposed in a vertical direction and along the same direction as the longitudinal axis of the feed reservoir, such as shown by the dotted line running down the center of the feeder in FIG. 5A. However, it is within the scope of this invention to dispose the feeding tube assembly shown in FIGS. 7, 8, 9A, 9B, 9C and 10 at an angle substantially perpendicular to the longitudinal axis of the feed reservoir, in similarly manner to a barrel with a dispensing valve tapped on the side near the bottom of the barrel.

Further provided is a hummingbird feeder kit comprised of a solution reservoir, and a feeding assembly, as exemplified herein. In a preferred embodiment, the solution reservoir is packaged with pre-made "ready-to-use" solution, or a dissolvable nutrient powder to which water can be added to form solution when the feeder is ready for use. The opening of the reservoir from which the solution is dispensed is covered by a removable cap or, more preferably, a piercable film to maintain the solution in the reservoir and maintain its composition and freshness until ready for use. In a preferred embodiment, the feeding assembly includes a piercing member which, when the user is prepared to assemble the feeder, can be used to easily puncture the piercable film so as to release the solution and make it accessible. Thus, where the solution reservoir is pre-packaged with a predetermined amount of "ready to serve" solution, one need only to remove a cap or film, and attach the feeding tube assembly, and hang the feeder. If, on the other hand, the solution reservoir is prepackaged with dissolvable, nutrient powder, one simply removes the film, or cap and adds the predetermined amount of water, by using a syringe or pump, for example, to the solution reservoir containing the powder to form a feeding solution. The kit therefore provides a hummingbird feeder that is simple to assemble and easy to use.

The foregoing specific embodiments of the present invention as set forth in the specification herein are for illustrative purposes only. Various deviations and modifications can be made within the spirit and scope of this invention, without departing from the main theme thereof. This includes, but is not limited to, the design of the feeding tube assembly, the number of feeding tubes incorporated into the feeder, the incorporation of other embodiments, such as a resting perch, the size and shape of the feeder, and the material from which the feeder is composed. It will be appreciated by persons skilled in the art that the present invention is not limited by what has been particularly shown and described herein above.

What is claimed is:

1. A feed dispenser comprising:
   a feed reservoir having a longitudinal axis for holding a nourishment; and
   a feeding assembly comprising a conduit having an outlet end and an inlet end, the outlet end provides the nourishment from the feed reservoir to an animal,
   the inlet end comprises an insertion and retention means for inserting the feeding assembly into the feed reservoir and for retaining the feeding assembly in the feed reservoir,
   wherein the insertion and retention means on the feeding assembly is configured to unreleasably engage with the feed reservoir when the feed reservoir is coupled to the feeding assembly and the feed dispenser being rendered non-reusable upon disengagement of the feeding assembly from the feed reservoir.

2. The feed dispenser of claim 1, wherein the feed reservoir comprises a first end and a second end, and wherein the second end comprises an orifice through which the insertion and retention mean is inserted and through which the nourishment flows to the feeding assembly.

3. The feed dispenser of claim 2, the insertion and retention means comprises a ramped surface connected to a blocking surface, wherein the ramped surface allows a one-way insertion of the conduit into the feed reservoir via the orifice, and wherein the blocking surface provides an abutment surface against a surface of the second end of the feed reservoir and thereby prevents the feeding assembly from decoupling from the feed reservoir after the feeding assembly has been inserted into the orifice.

4. The feed dispenser of claim 2, further comprising a means disposed at the first end of the feed reservoir for suspending the feed dispenser.

5. The feed dispenser of claim 1, further comprising an insect barrier.

6. The feed dispenser of claim 1, wherein the means for insertion and retention comprises at least two fins disposed at the inlet end of the conduit.

7. The feed dispenser of claim 1, wherein the means for insertion and retention is at least one flanged coupler disposed around the conduit at the inlet end, the flanged coupler includes at least one angled flange forming a ramped surface to facilitate the insertion of the coupler into the orifice, and a locking surface to prevent the coupler from exiting the orifice.

8. The feed dispenser of claim 2, wherein the feeding assembly further comprises a stopper disposed in proximity to the insertion and retention means so as to maintain the inlet end having the insertion and retention means in close proximity to the orifice of the feed reservoir when the insertion and retention means is unreleasably engaged with the feed reservoir.

9. The feed dispenser of claim 1, wherein the outlet end of the feeding assembly comprises a leakage controlling means having flexible member covering the opening at the outlet end, and wherein the flexible member comprises at least one slit.

10. The feed dispenser of claim 1, wherein the conduit further comprises a second portion extending along the longitudinal axis and a bendable portion between the first and second portions.

11. A feed dispenser comprising:
    a feed reservoir having a longitudinal axis for holding a nourishment;
    a feeding assembly comprising a conduit having an outlet end and an inlet end, the outlet end provides the nourishment from the feed reservoir to an animal,
    the inlet end comprises an insertion and retention means for inserting the feeding assembly into the feed reservoir and for retaining the feeding assembly in the feed reservoir,
    wherein the insertion and retention means on the feeding assembly is configured to unreleasably engage with the feed reservoir when the feed reservoir is coupled to the feeding assembly,
    wherein the feed reservoir comprises a first end and a second end, and wherein the second end comprises an orifice through which the insertion and retention mean is inserted and through which the nourishment flows to the feeding assembly; and
    a frangible member covering the orifice, wherein the insertion and retention means is adapted to pierce the frangible member, when the conduit is inserted into the orifice such that an un-releasable coupling is formed between the feeding reservoir and the feeding assembly, and to conduct feeding solution from the feed reservoir.

12. A feed dispenser comprising:
    a feed reservoir having a longitudinal axis for holding a nourishment; and
    a feeding assembly comprising a conduit having an outlet end and an inlet end, the outlet end provides the nourishment from the feed reservoir to an animal, the inlet end comprises an insertion and retention means for inserting the feeding assembly into the feed reservoir and for retaining the feeding assembly in the feed reservoir, wherein the insertion and retention means on the feeding assembly is configured to unreleasably engage with the feed reservoir when the feed reservoir is coupled to the feeding assembly, wherein the means for insertion and retention is a frusto-conical coupler having a nourishment-channeling portion formed along a longitudinal direction, wherein the nourishment-channeling portion is a part of the conduit, wherein a small end of the frusto-conical member is of sufficient size to fit an orifice and to pierce a frangible member on the feed reservoir, and wherein a large end of the frusto-conical member is sufficiently larger than the orifice so as to allow insertion of the frusto-conical member to pass through the orifice in one direction while preventing a complete withdrawal of the frusto-conical member in the opposite direction.

13. A feed dispenser comprising:

a feed reservoir having a longitudinal axis for holding a nourishment; and a feeding assembly comprising a conduit having an outlet end and an inlet end, the outlet end provides the nourishment from the feed reservoir to an animal, the inlet end comprises an insertion and retention means for inserting the feeding assembly into the feed reservoir and for retaining the feeding assembly in the feed reservoir, wherein the insertion and retention means on the feeding assembly is configured to unreleasably engage with the feed reservoir when the feed reservoir is coupled to the feeding assembly, wherein the feed reservoir comprises a first end and a second end, and wherein the second end comprises an orifice through which the insertion and retention mean is inserted and through which the nourishment flows to the feeding assembly, wherein the second end of the feed reservoir comprises a resilient annular member formed around the orifice so as to allow the insertion and retention means to pass through in one direction and to provide a liquid-tight seal around the conduit after the insertion of the feeding assembly into the feed reservoir.

14. A feed dispenser comprising:

a feed reservoir having a longitudinal axis for holding a nourishment;

a feeding assembly comprising a conduit having an outlet end and an inlet end, the outlet end provides the nourishment from the feed reservoir to an animal, the inlet end comprises an insertion and retention means for inserting the feeding assembly into the feed reservoir and for retaining the feeding assembly in the feed reservoir, wherein the insertion and retention means on the feeding assembly is configured to unreleasably engage with the feed reservoir when the feed reservoir is coupled to the feeding assembly, wherein the feed reservoir comprises a first end and a second end, and wherein the second end comprises an orifice through which the insertion and retention mean is inserted and through which the nourishment flows to the feeding assembly; and a frangible member covering the orifice, wherein the insertion and retention means is adapted to pierce the frangible member, when the conduit is inserted into the orifice such that an un-releasable coupling is formed between the feeding reservoir and the feeding assembly, and to conduct feeding solution from the feed reservoir, wherein the means for insertion and retention is a frusto-conical coupler having a nourishment-channeling portion formed along a longitudinal direction, wherein the nourishment-channeling portion is a part of the conduit, wherein a small end of the frusto-conical member is of sufficient size to fit the orifice and to pierce the frangible member on the feed reservoir, and wherein a large end of the frusto-conical member is sufficiently larger than the orifice so as to allow insertion of the frusto-conical member to pass through the orifice in one direction while preventing a complete withdrawal of the frusto-conical member in the opposite direction.

\* \* \* \* \*